United States Patent [19]

Wallace

[11] Patent Number: 4,511,603
[45] Date of Patent: Apr. 16, 1985

[54] ADDITION OF ADDITIVES TO PLASTICS

[75] Inventor: Leslie E. Wallace, Midland, Mich.

[73] Assignee: The Dow Chemical Company, Midland, Mich.

[21] Appl. No.: 562,923

[22] Filed: Dec. 19, 1983

[51] Int. Cl.³ ............................................... B05D 1/02
[52] U.S. Cl. .................................... 427/222; 118/303
[58] Field of Search ......................... 427/222; 118/303

[56]  References Cited
U.S. PATENT DOCUMENTS

| 2,071,846 | 2/1937 | Lamb et al. | 118/303 |
| 2,197,792 | 4/1940 | Erickson | 118/303 |
| 3,841,263 | 10/1974 | Rohloff | 118/303 |
| 3,976,030 | 8/1976 | Ragsdale | 118/303 |

Primary Examiner—Shrive P. Beck
Attorney, Agent, or Firm—R. B. Ingraham

[57]  ABSTRACT

Additives are sprayed onto synthetic resinous thermoplastic particles by applying a spray nozzle at an elbow spraying radially outwardly.

4 Claims, 1 Drawing Figure

U.S. Patent Apr. 16, 1985 4,511,603
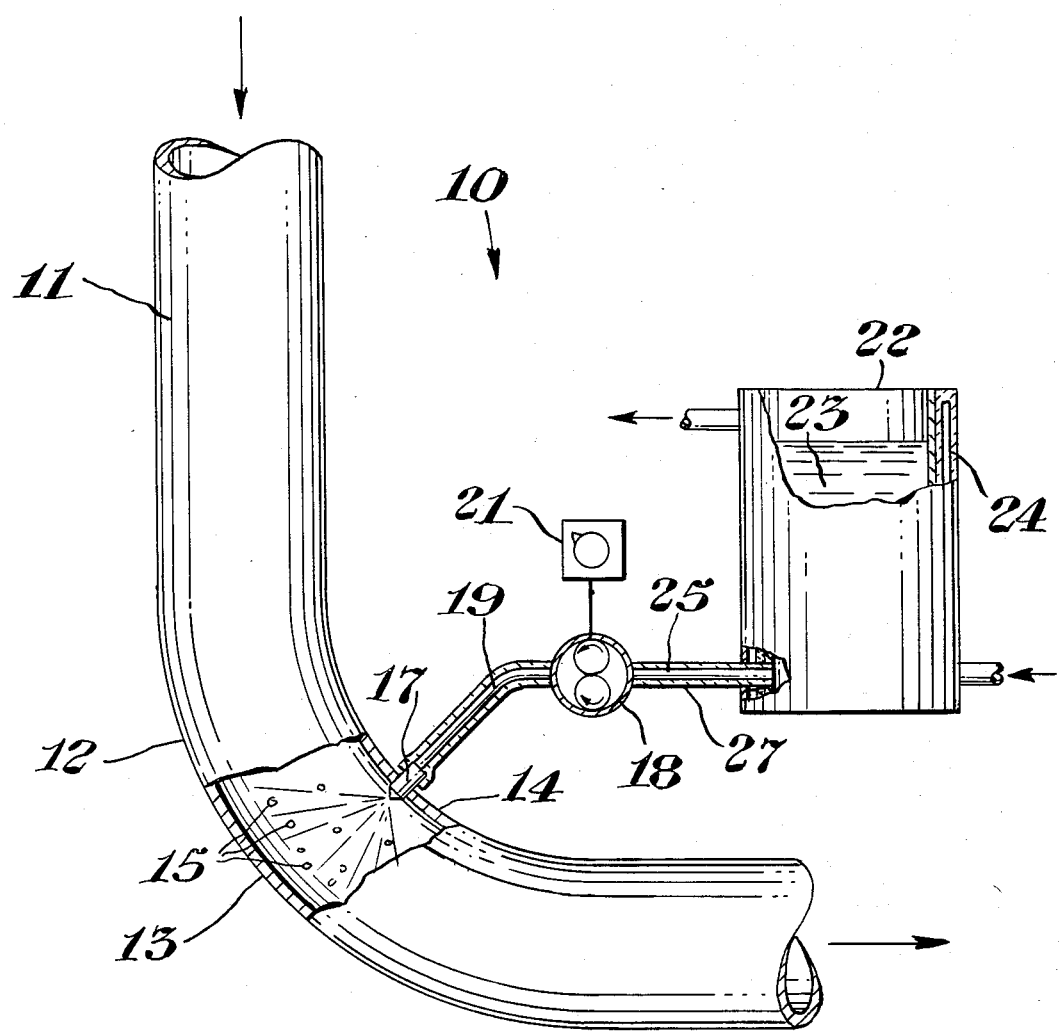

ADDITION OF ADDITIVES TO PLASTICS

Synthetic resinous thermoplastics oftentimes are compounded with various additives such as wax, oils and the like which act as lubricants. Such materials may be incorporated into synthetic resins by a variety of means including compounding extruders, ribbon blenders, double cone blenders and the like. Or, such additives may be incorporated within the monomer mixture and the monomer polymerized to form the resin in the presence of the additives. Oftentimes thermoplastic resinous materials are employed in granular form. A particular thermoplastic resin may be sold for a variety of purposes wherein the additives may differ depending on the particular end use of the resin.

It is desirable that the additive or additives be readily varied to meet a particular end use with minimum effort.

It would also be desirable if there were a method and apparatus which would permit readily changing the composition of an additive to a particulate synthetic thermoplastic resin.

It would also be desirable if there were a method and apparatus that would permit the addition of additives to a particulate thermoplastic resin in widely varying quantities.

These benefits and other advantages in accordance with the present invention are achieved in an apparatus for the addition of additives to particulate synthetic resins, the apparatus comprising a pneumatic conveyor adapted to convey particulate synthetic resinous thermoplastic material, the pneumatic conveyor having disposed therein at least one elbow, the elbow having an external radius and an internal radius, a spray nozzle disposed at the inside radius and adapted to spray material into the conveyor generally toward the outside radius of the elbow, a pump in operative communication with said nozzle therewith, a vessel for the containment of liquid additive.

Also contemplated within the scope of the present invention is a method of applying an additive to synthetic resinous thermoplastic particles, the scope of the method comprising entraining a plurality of synthetic resinous thermoplastic particles within a stream of gas, confining said stream of gas within a conduit, said conduit having an elbow therein, the elbow having an external radius and an internal radius, a spray nozzle on said inside radius and spraying an additive for the thermoplastic particles into said conveyor in a direction generally toward the outside radius.

Further features and advantages of the present invention will become more apparent from the following specification taken in connection with the drawing wherein the Figure schematically depicts the method and apparatus of the present invention.

In the Figure there is schematically depicted an additive apparatus in accordance with the present invention generally indicated by the reference numeral 10. The apparatus 10 comprises in cooperative combination a pneumatic conveyor 11. The pneumatic conveyor 11 has disposed therein an elbow 12. The elbow 12 has an external radius 13 and an internal radius 14. Disposed within the conveyor 11 is a plurality of synthetic resinous thermoplastic particles generally indicated by the reference numeral 15. The particles 15 are entrained in a gas, such as air, moving in the direction indicated by the arrows. A spray nozzle 17 is disposed on the inside radius 14 of the elbow 12 and adapted to discharge material toward the outside radius 13 of the elbow 12. The spray nozzle 17 is in operative communication with a pump 18 by means of a heated conduit 19. The rotation of the pump 18 is controlled by a speed controller 21 in operative communication therewith. Adjacent the pump 18 and remote from the nozzle 17 is a jacketed vessel 22 having contained therein a heated liquid additive material 23. The vessel 22 has a temperature control jacket 24 through which a heat exchange fluid is passed from a fluid source not shown. The interior of the vessel 22 is in communication with the pump 18 by means of conduit 25. As depicted in the Figure, the nozzle 17, conduit 19, pump 18 and conduit 25 have associated therewith a heating jacket 27. In operation of the apparatus of the present invention and practice of the method of the invention with reference to the Figure, synthetic resinous thermoplastic particles are conveyed within the conduit 11 by air moving in the direction indicated by the arrows, and the pump 18 forwards liquid such as the liquid 23 through conduit 19 and discharges the liquid into the conduit and toward the outer radius of the elbow 12.

Generally, such additives are frequently solids at ambient temperature and before pumping and spraying, they must be melted. Generally it is desirable that such melting should be accomplished under an inert atmosphere such as a nitrogen blanket. By selecting an elbow as a location for spraying an additive material, particularly from the inside radius of the elbow, the scrubbing action of the thermoplastic resinous particles prevents a buildup of additive material on the inside surface of the outside radius of the elbow.

By way of further illustration a 6-inch diameter duct was employed to convey about 400 pounds per minute of particulate polystyrene. Employing apparatus essentially as depicted in the Figure, 0.52 pounds per minute of a mixture of 4 parts by weight of n,n-ethylenebis-stearamide, 4 parts by weight of stearic acid and 5 parts by weight of a polyethylene glycol having a molecular weight of about 400 grams mole. The mixture was at a temperature of 135 degrees centigrade and fed to the spray nozzle at a pressure of about 125 pounds per square inch. The resultant polystyrene particles were coated with sufficient uniformity for commercial purposes and no buildup of the additive material was observed in the elbow.

In a manner similar to the foregoing, a wide variety of other additives can be incorporated on particulate synthetic resinous particles.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. An apparatus for the addition of additives to particulate synthetic resins, the apparatus comprising a pneumatic conveyor adapted to convey particulate synthetic resinous thermoplastic material, the pneumatic conveyor having disposed therein at least one elbow, the elbow having an external radius and an internal radius, a spray nozzle disposed at the inside radius and adapted to spray said additive into the conveyor generally toward the outside radius of the elbow, a pump in operative communication with said nozzle therewith, a vessel for the containment of liquid additive in communication with the pump.

2. The apparatus of claim 1 including means to heat said vessel, said pump and the spray nozzle.

3. The apparatus of claim 1 in combination with means to supply a particulate synthetic resinous thermoplastic material and means to discharge synthetic resinous thermoplastic material.

4. A method of applying an additive to synthetic resinous thermoplastic particles, the scope of the method comprising entraining a plurality of synthetic resinous thermoplastic particles within a stream of gas, confining said stream of gas within a conduit, said conduit having an elbow therein, the elbow having an external radius and an internal radius, a spray nozzle on said inside radius and spraying an additive for the thermoplastic particles into said conveyor in a direction generally toward the outside radius.

* * * * *